United States Patent
Hiroshima et al.

(10) Patent No.: US 7,993,171 B2
(45) Date of Patent: Aug. 9, 2011

(54) CONTROL APPARATUS FOR SMALL BOAT

(75) Inventors: Naoki Hiroshima, Saitama (JP);
Norikazu Shimizu, Saitama (JP);
Kentaro Furuya, Saitama (JP);
Shinsaku Nakayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 190 days.

(21) Appl. No.: 12/387,624

(22) Filed: May 5, 2009

(65) Prior Publication Data

US 2009/0298359 A1 Dec. 3, 2009

(30) Foreign Application Priority Data

May 30, 2008 (JP) .................................. 2008-141963

(51) Int. Cl.
*B63H 21/21* (2006.01)
(52) U.S. Cl. .............................................. 440/1; 440/87
(58) Field of Classification Search .............. 114/144 R, 114/144 RE; 123/396; 440/1, 84, 87; 701/1, 701/65, 67, 70, 80
See application file for complete search history.

(56) References Cited

U.S. PATENT DOCUMENTS

| | | | | |
|---|---|---|---|---|
| 6,098,994 A | * | 8/2000 | Kunishima et al. | 280/5.514 |
| 6,884,128 B2 | * | 4/2005 | Okuyama et al. | 440/1 |
| 2003/0027468 A1 | * | 2/2003 | Into | 440/84 |
| 2006/0154537 A1 | * | 7/2006 | Mizushima et al. | 440/84 |
| 2008/0115712 A1 | * | 5/2008 | Hiroshima et al. | 114/144 RE |

FOREIGN PATENT DOCUMENTS

JP 5-58383 A 3/1993

* cited by examiner

*Primary Examiner* — Lars A Olson
(74) *Attorney, Agent, or Firm* — Carrier Blackman & Associates, P.C.; Joseph P. Carrier; William D. Blackman

(57) ABSTRACT

In an apparatus for controlling a small boat having a hull and two outboard motors mounted on a stern of the hull and an actuator adapted to open/close a throttle valve of each engine of the motors for regulating speed of the engine, acceleration acting on the boat in a direction of gravity axis when the boat ascends or descends the ocean wave and angular acceleration about the gravity is detected and a correction amount of the engine speed is calculated based on the detected acceleration so as to change behavior of the boat, thereby mitigating a burden on the operator and improving stability of the boat.

10 Claims, 8 Drawing Sheets

| HULL [G] | 1.0 | 1.2 | 1.0 | 0.8 |
|---|---|---|---|---|
| COMMAND OF DESIRED ENGINE SPEED [rpm] | ±0 | +100 | ±0 | ±0 |

US 7,993,171 B2

CONTROL APPARATUS FOR SMALL BOAT

BACKGROUND OF THE INVENTION

1. Field of the Invention

This invention relates to a control apparatus for small boat.

2. Description of the Related Art

There is known a technique to detect acceleration acting on a small boat in the roll (horizontal) direction and control operation of right and left hydraulic flaps to move up and down so that the detected acceleration becomes equal to or less than a set value for improving stability and comfort level of the boat, as taught by, for example, Japanese Laid-Open Patent Application No. Hei 5 (1993)-58383.

Although, in the prior art, the acceleration acting on the boat in the roll direction is detected and the hydraulic flaps are controlled to move up and down to eliminate the influence of wind disturbance, since small boats tend to be affected by disturbance of not only the wind but also the wave, the operator must regulate engine speed and navigation direction with the use of instruments, resulting in a great burden on the operator and rendering the stability of the boat insufficient.

SUMMARY OF THE INVENTION

An object of this invention is therefore to overcome this problem by providing a control apparatus for a small boat that detects acceleration acting on the boat and corrects or regulates engine speed so as to change behavior of the boat based on the detected acceleration, thereby mitigating a burden on the operator and improving stability of the boat.

In order to achieve the object, this invention provides an apparatus for controlling a small boat having a hull, at least one outboard motor driven by an internal combustion engine and adapted to be mounted on a stern of the hull, and an actuator adapted to open/close a throttle valve of the engine for regulating speed of the engine, comprising: an acceleration sensor installed on the boat to generate an output indicative of acceleration acting on the boat in a direction of gravity axis; a correction amount calculator that calculates a correction amount of the engine speed based on the output of the acceleration sensor so as to change behavior of the boat; and an actuator controller that controls operation of the actuator based on the calculated correction amount.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A control apparatus for small boat according to a preferred embodiment of this invention will now be explained with reference to the attached drawings.

Figure 1:
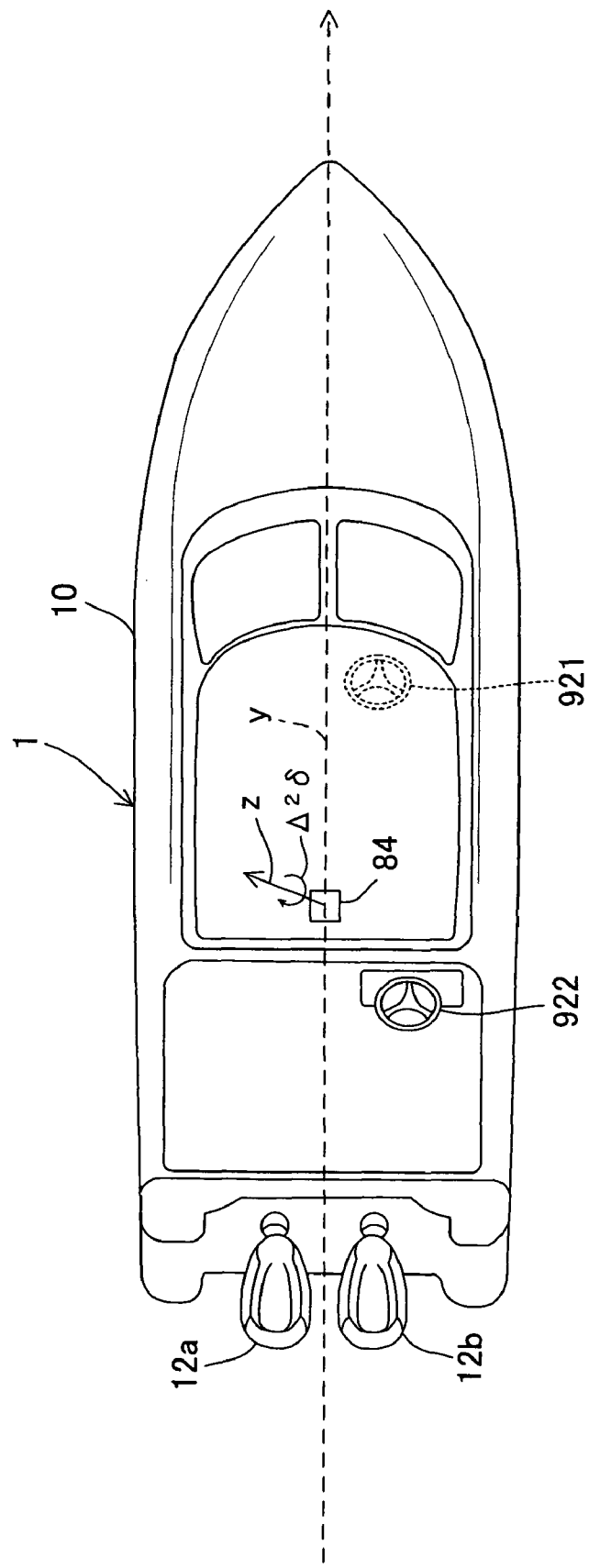
FIG. 1 is a plan view of a small boat on which a control apparatus for small boat according to an embodiment of this invention is mounted.

FIG. 1 is a plan view of a small boat on which a control apparatus for small boat according to an embodiment of this invention is mounted.

Reference numeral 1 in FIG. 1 designates a boat (small boat). The boat 1 is equipped with a hull 10 and at least one outboard motor, specifically two outboard motors 12 (12*a*, 12*b*) fastened to the stern of the hull 10 in parallel. In the following, the port side outboard motor 12*a*, i.e., outboard motor on the left side when looking in the direction of forward is called the "port outboard motor", and the starboard side outboard motor 12*b*, i.e., outboard motor on the right side the "starboard outboard motor."

Figure 2:
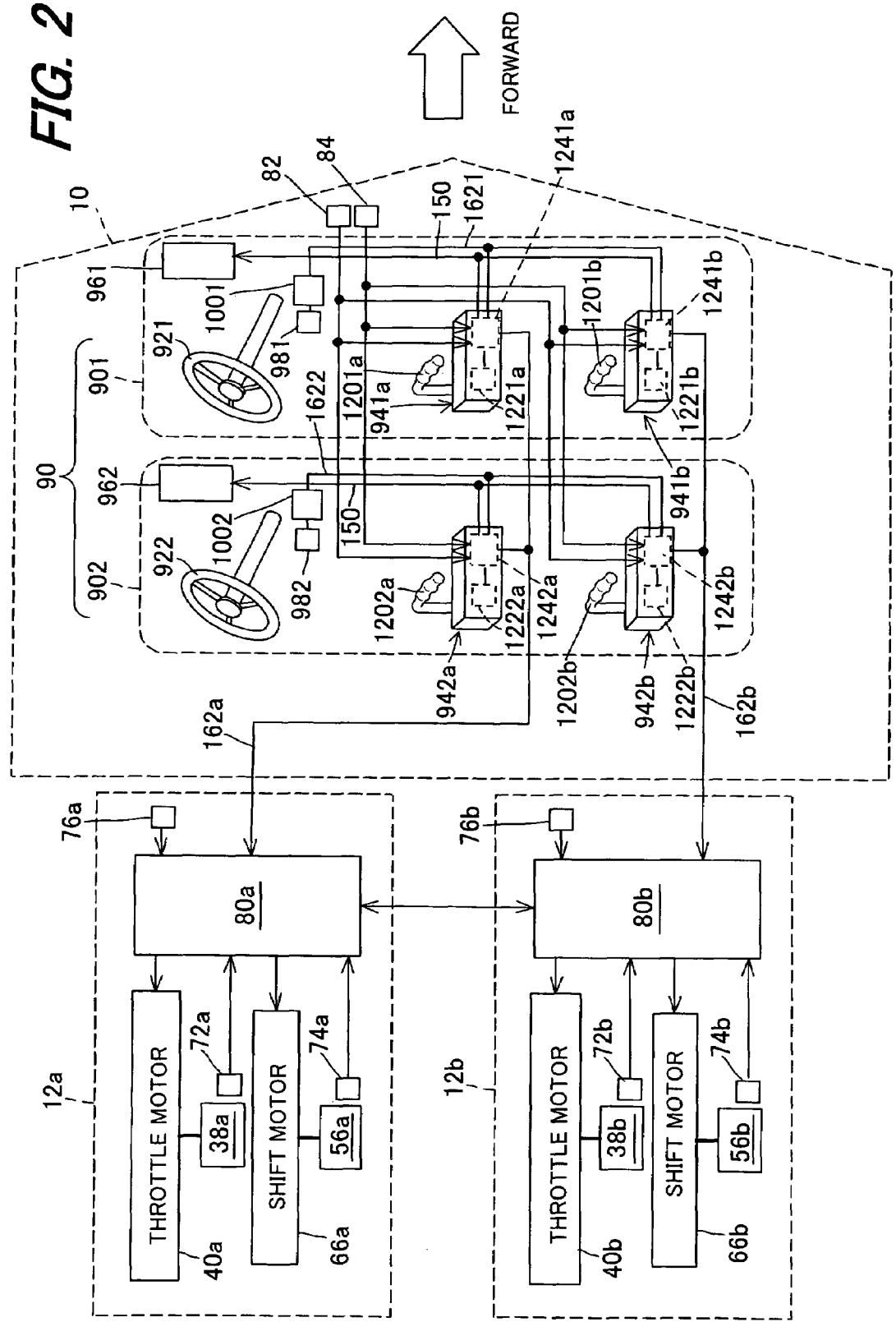
FIG. 2 is an overall view schematically showing the apparatus shown in FIG. 1.
Figure 3:
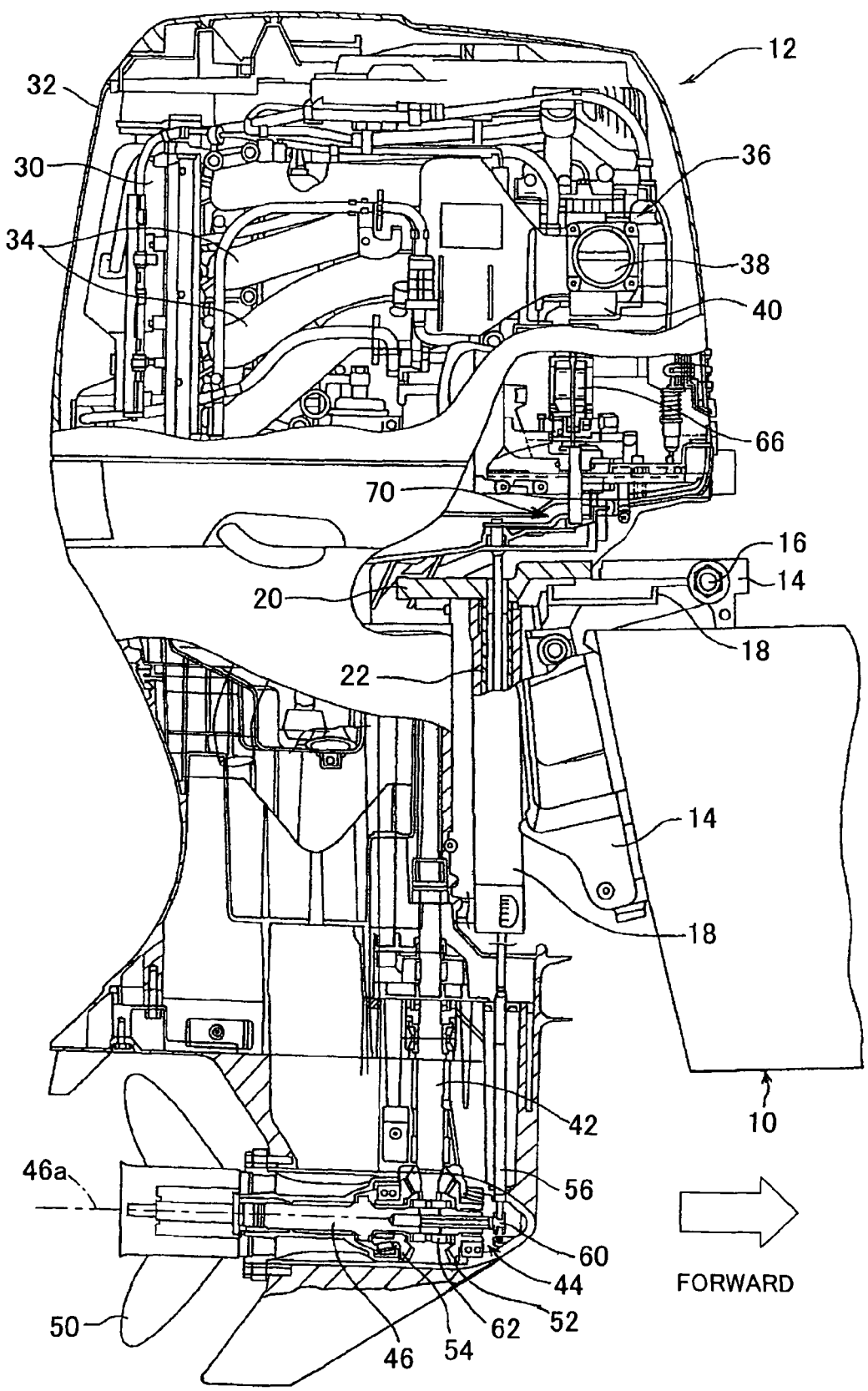
FIG. 3 is an enlarged cross-sectional side view partially showing an outboard motor shown in FIG. 1 etc.

FIG. 2 is an overall view schematically showing the apparatus mounted on the boat 1 shown in FIG. 1 and FIG. 3 is an enlarged cross-sectional side view partially showing the outboard motor 12 shown in FIG. 1 etc.

Before explaining FIG. 2, the structure of the outboard motors 12 will be mentioned in detail with reference to FIG. 3. Since the outboard motors 12*a*, 12*b* have the substantially same configuration, the indications of a and b are omitted in the following explanation and FIG. 3.

As shown in FIG. 3, the outboard motors 12 are each fastened to the stern of the hull 10 through stern brackets 14 and also fastened thereto through a tilting shaft 16 to regulate the tilting angle. The outboard motor 12 is equipped with a swivel case 18 and a mount frame 20 whose shaft 22 is housed in the swivel case 18. The upper and lower ends of mount frame 20 are fastened to a frame (not shown) constituting a main body of the outboard motor 12. Thus the outboard motor 12 is immovably fastened to the hull 10, i.e., fixed not to be rotated about the gravity axis (vertical axis).

The outboard motor 12 is equipped with an internal combustion engine (hereinafter referred to as "engine") 30 at its upper portion. The engine 30 comprises a spark-ignition water-cooled gasoline engine with a displacement of 2,200 cc. The engine 30 is located above the water surface and covered by an engine cover 32.

The engine 30 has an intake pipe 34 that is connected to a throttle body 36. The throttle body 36 has a throttle valve 38 installed therein and an electric throttle motor (throttle actuator) 40 is integrally disposed thereto to open and close the throttle valve 38. The output shaft of the throttle motor 40 is connected to the throttle valve 38 via a speed reduction gear mechanism (not shown) installed near the throttle body 36. Specifically, the throttle motor 40 is operated to open and close the throttle valve 38, thereby regulating air sucked in the engine 30 to control the engine speed.

The outboard motor 12 is equipped with a drive shaft 42 installed in parallel with the gravity axis and supported to be rotated thereabout. The upper end of the drive shaft 42 is connected to a crankshaft (not shown) of the engine 30 and the lower end thereof is connected via a shift mechanism 44 with a propeller shaft 46 supported to be rotated about the horizontal axis. The propeller shaft 46 is located such that its axis line 46a is to be substantially parallel to the navigation direction of the boat 10. One end of the propeller shaft 46 is attached with the propeller 50.

The shift mechanism 44 comprises a forward bevel gear 52 and reverse bevel gear 54 which are connected to the drive shaft 42 to be rotated, and a clutch 62 which is rotated integrally with the propeller shaft 46 and can be engaged with either one of the forward bevel gear 52 and reverse bevel gear 54 by displacement of a shift rod 56 and shift slider 60.

The interior of the engine cover 32 is disposed with an electric shift motor (shift actuator) 66 that drives the shift mechanism 44. The output shaft of the shift motor 66 can be connected via a speed reduction gear mechanism 70 with the upper end of the shift rod 56 of the shift mechanism 44. Therefore, when the shift motor 66 is driven, its output displaces the shift rod 56 and shift slider 60, thereby driving the clutch 62 to be engaged with either the forward bevel gear 52 or the reverse bevel gear 54.

The rotational output of the drive shaft 42 is transmitted via the shift mechanism 44 to the propeller shaft 46 to rotate the propeller 50 in one of the directions making the boat 10 move forward or rearward. The engagement of the clutch 62 with one of the bevel gears 52, 54 can be released by driving the shift motor 66 to displace the shift slider 60 to an appropriate position. Specifically, the shift motor 66 is operated to drive the clutch 62 of the shift mechanism 44, thereby switching the shift position among forward, reverse and neutral positions.

Thus the outboard motor 12 is configured such that the shift mechanism 44 and throttle valve 38 of the mounted engine 30 are operated by the motors 40, 66. The outboard motor 12 is equipped with a power source (not shown) such as a battery or the like attached to the engine 30 to supply operating power to the motors 40, 66 and other components.

The explanation on the control apparatus will be made with reference to FIG. 2. The outboard motors 12 are each equipped with a throttle opening sensor 72, shift position sensor 74 and crank angle sensor 76 (none of which are shown in FIG. 3). Although the indication of a is suffixed to components of the outboard motor 12a and the indication of b to those of the outboard motor 12b in FIG. 2, the indications are omitted in the following explanation unless necessary.

The throttle opening sensor 72 is installed near the throttle valve 38 and produces an output or signal indicative of throttle opening. The shift position sensor 74 is installed near the shift rod 56 and produces an output or signal indicative of shift position, i.e., rotation angle of the shift rod 56. The crank angle sensor 76 installed near the crankshaft of the engine 30 produces a pulse signal at every predetermined crank angle.

The outputs of the foregoing sensors are sent to an Electronic Control Unit (ECU) 80 provided in each of the two outboard motors 12. The ECU 80 has a microcomputer including a CPU, ROM, RAM and other devices and installed in the engine cover 32 of the outboard motor 12.

The hull 10 is installed with a declinometer (azimuth detector) 82 that produces an output or signal indicative of a direction of navigation of the boat 1 and comprises a receiver receiving, for example, a GPS (Global Positioning System) signal and an acceleration sensor 84 that detects acceleration acting on the boat 1. As shown in FIG. 1, the acceleration sensor 84 is installed in the hull 10 at a position corresponding to the center of gravity of the boat 1 and produces outputs or signals indicative of acceleration acting on the boat 1 in the direction of gravity axis z (i.e., direction of gravity), angular acceleration (rotational acceleration) $\Delta^2 \delta$ about the gravity axis z, and acceleration in the navigation direction y of the boat 1.

The boat 1 is equipped with a plurality of, i.e., two navigation units 90 installed to be manipulated by the operator. In the following, the navigation unit assigned with reference numeral 90 having a suffix 1, namely 901, will be called the first navigation unit and the navigation unit assigned with 90 having a suffix 2, namely 902, will be called the second navigation unit. The first and second navigation units 901, 902 produce outputs or signals indicative of drive commands for the aforementioned motors 40, 66 in response to manipulation by the operator.

The first navigation unit 901 comprises a steering wheel 921 disposed to be rotated or manipulated by the operator, two remote control boxes 941a, 941b and an indicator (instrument) 961 that indicates engine speed NE, steering angle and the like. Similarly, the second navigation unit 902 comprises a steering wheel 922, two remote control boxes 942a, 942b and an indicator 962. As shown in FIG. 1, the steering wheel 921 of the first navigation unit 901 is installed in the cabin and the steering wheel 922 of the second navigation unit 902 on the stern side.

Among the four remote control boxes, the remote control boxes 941a, 942a produce outputs or signals indicating drive commands for the port outboard motor 12a and the remote control boxes 941b, 942b produce those for the starboard outboard motor 12b.

Steering angle sensors 981, 982 installed near the rotary shafts of the steering wheels 921, 922 produce outputs or signals corresponding to the steering angles of the steering wheels 921, 922 manipulated by the operator. The outputs of the steering angle sensors 981, 982 are sent to steering angle sensor units 1001, 1002 to be latched.

The remote control boxes 941a, 941b, 942a, 942b are equipped with shift/throttle levers 1201a, 1201b, 1202a, 1202b installed to be swung or manipulated by the operator. The shift/throttle levers 1201a, 1201b, 1202a, 1202b are used by the operator to input shift position change commands and engine speed regulation commands (commands for operating the throttle motors 40a, 40b).

Lever position sensors 1221a, 1221b, 1222a, 1222b are installed near the shift/throttle levers 1201a, 1201b, 1202a, 1202b and detect lever positions inputted by the operator. The outputs of the lever position sensors 1221a, 1221b, 1222a, 1222b are sent to lever position sensor units 1241a, 1241b, 1242a, 1242b to be latched.

The steering angle sensor units 1001, 1002 and lever position sensor units 1241a, 1241b, 1242a, 1242b are connected via electric signal lines 162a, 162b to the ECUs 80a, 80b installed in the outboard motors 12a, 12b and the ECUs 80a, 80b can communicate with each other.

The operation of the control apparatus for small boat according to the embodiment will be explained.

Figure 4:
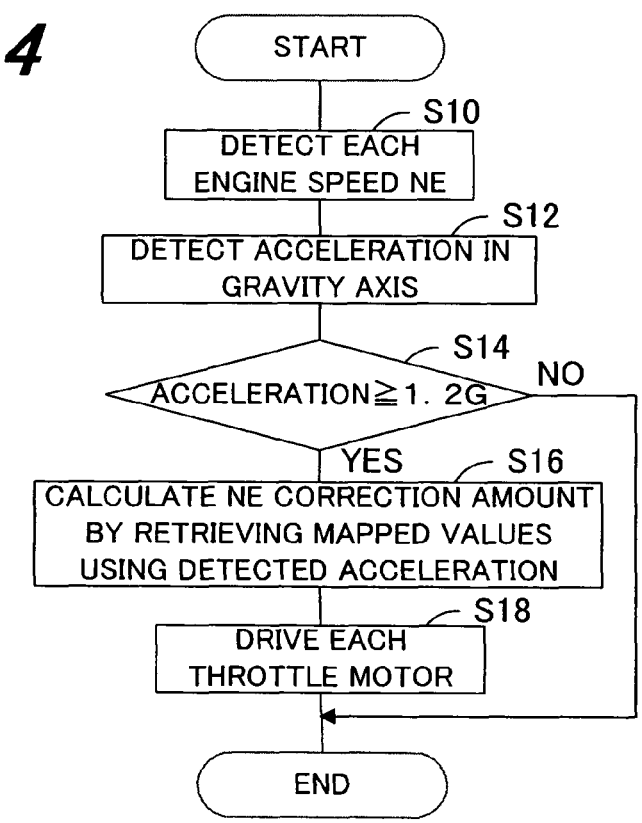
FIG. 4 is a flowchart showing the operation of the apparatus shown in FIG. 2.

FIG. 4 is a flowchart showing the operation. The illustrated program is executed in either one of the ECUs 80a, 80b, e.g., the ECU 80a.

In S10, the engine speed NE of each of the engines 30 mounted on the outboard motors 12a, 12b is detected based on the outputs of the crank angle sensors 76, in S12, acceleration acting on the boat 1, i.e., the hull 10, in the direction of gravity axis is detected based on the output of the acceleration sensor 84.

Next in S14, it is determined whether the detected acceleration in the direction of gravity axis is equal to or greater than 1.2 G. Here, the term "G" means a unit of acceleration of gravity (g), i.e., corresponds to 9.8 m/s².

Figure 5:
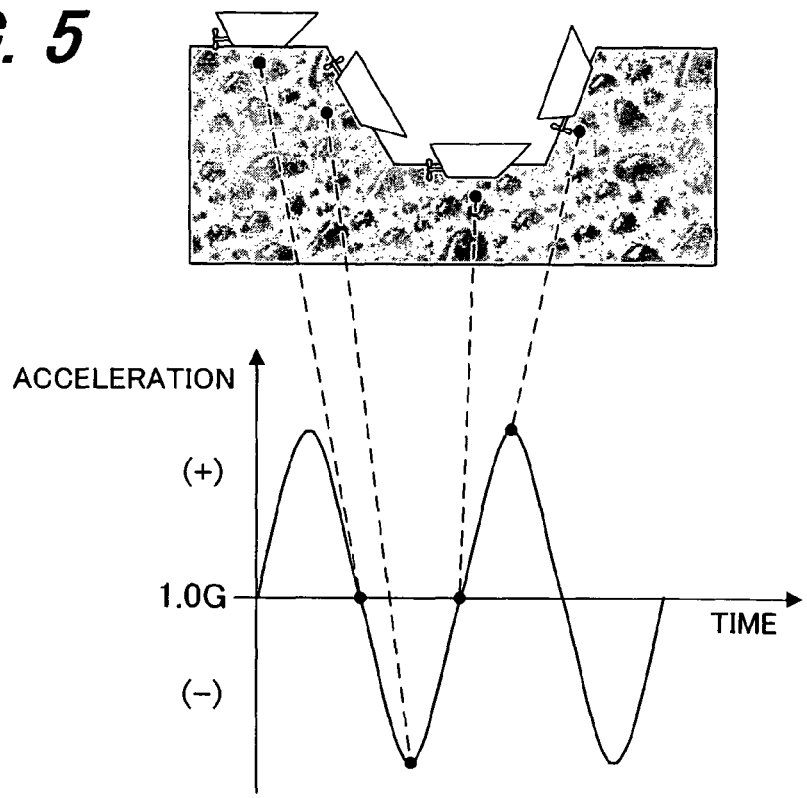
FIG. 5 is a view for explaining the processing of FIG. 4.
Figure 6:
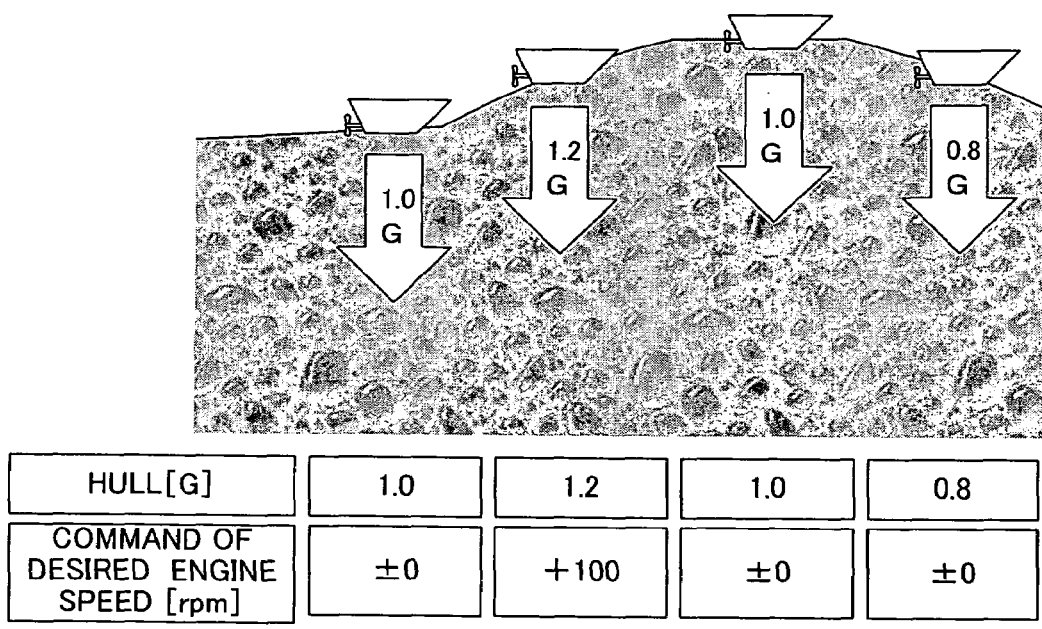
FIG. 6 is a view similarly explaining the processing of FIG. 4.

Explaining the processing of FIG. 4 with reference to FIGS. 5, 6, when the boat 1 navigates on the ocean, acceleration acting on the hull 10 in the direction of gravity axis is 1.0 G (the same as the case of vehicle on the level ground) insofar as the hull 10 does not move up and down. When it descends the slope of wave, the acceleration decreases to 0.8 G or thereabout, while, when it ascends the slope of wave, the acceleration increases to 1.2 G or thereabout.

If the engine speed NE is the same, the boat speed fluctuates with increasing/decreasing acceleration in the direction of gravity axis and this leads to a worsening of ride quality. In order to avoid such a disadvantage, the operator has to check the engine speed NE frequently through the indicators 961, 962, resulting in a great burden on the operator and degrading the stability of the boat 1.

Therefore, in this embodiment, a correction amount of the engine speed NE is calculated so as to change the behavior of the boat 1 based on the acceleration in the direction of gravity axis, specifically, the correction amount of the engine speed NE is calculated to increase the speed of the boat 1 as the acceleration increases. In the case where the acceleration drops below 1.0 G, since the boat speed increases, the engine speed NE is not corrected.

Figure 7:
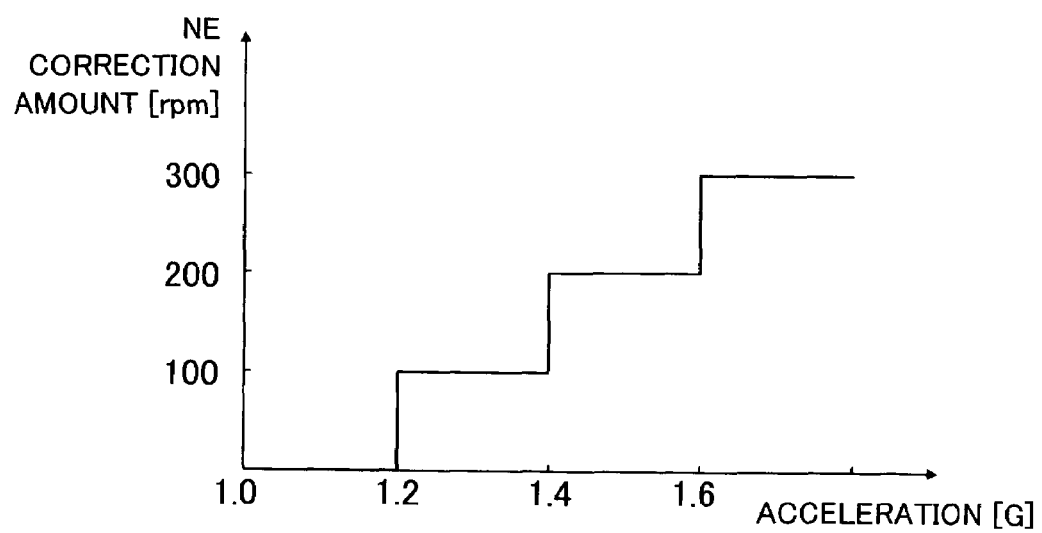
FIG. 7 is an explanatory graph showing the characteristics of mapped values for an engine speed correction amount used in the processing of FIG. 4.

Resuming the explanation on FIG. 4, when the result in S14 is Yes, the program proceeds to S16, in which an engine speed correction amount is retrieved from mapped values using the detected acceleration as address data. FIG. 7 is an explanatory graph showing the characteristics of the mapped values. As illustrated, the engine speed correction amount is set beforehand with respect to the detected acceleration, i.e., it is set to increase by 100 rpm at every 0.2 G increase of the acceleration after exceeding 1.2 G.

Then in S18, the throttle motors 40 of the engines 30 mounted on the outboard motors 12a, 12b are each driven, i.e., the operation thereof is controlled to increase the engine speed NE by the correction amount.

The relationship between the engine speed NE and navigation direction of the boat 1 according to this embodiment will be explained with reference to FIGS. 8 and 9.

Figure 8:
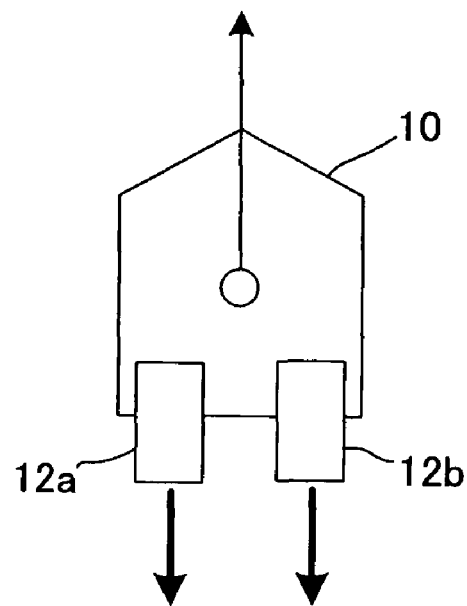
FIG. 8 is a view for explaining the relationship between speed of the engine of the apparatus shown in FIG. 2 and navigation direction of the boat.
Figure 9:
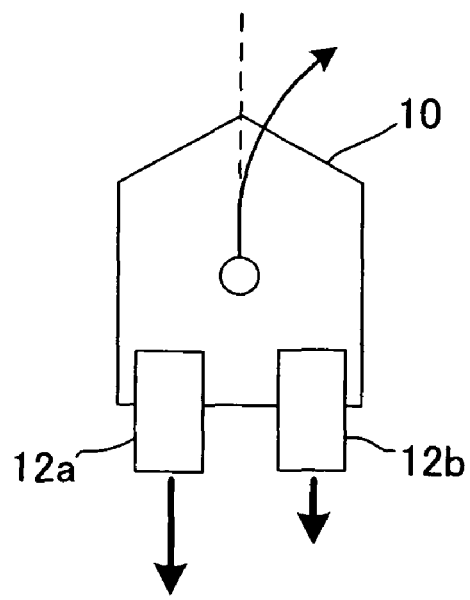
FIG. 9 is a view similarly explaining the relationship between the engine speed of the apparatus shown in FIG. 2 and navigation direction of the boat.

When the operator does not manipulate the steering wheels 921, 922, i.e., desires to move the boat 12 straight ahead, the operations of the throttle motors 40a, 40b are controlled cooperatively to make the outputs of the port and starboard outboard motors 12a, 12b identical, as shown in FIG. 8. In FIG. 8 etc., arrows extending from the outboard motors 12 indicate the outputs of the outboard motors (engine output), and length thereof indicates magnitude of the outputs.

When the operator manipulates the steering wheel 921 (or 922) to the right, the throttle motor 40b of the starboard outboard motor 12b is operated so that the throttle valve 38b is driven in the closing direction to decrease the engine speed NE, thereby regulating the boat 1 to move to the right. On the other hand, although not shown in the drawing, when the operator manipulates the steering wheel 921 (or 922) to the left, the throttle motor 40a of the port outboard motor 12a is operated so that the throttle valve 38a is driven in the closing direction.

Next, the operation of the control apparatus for small boat according to a second embodiment will be explained.

Figure 10:
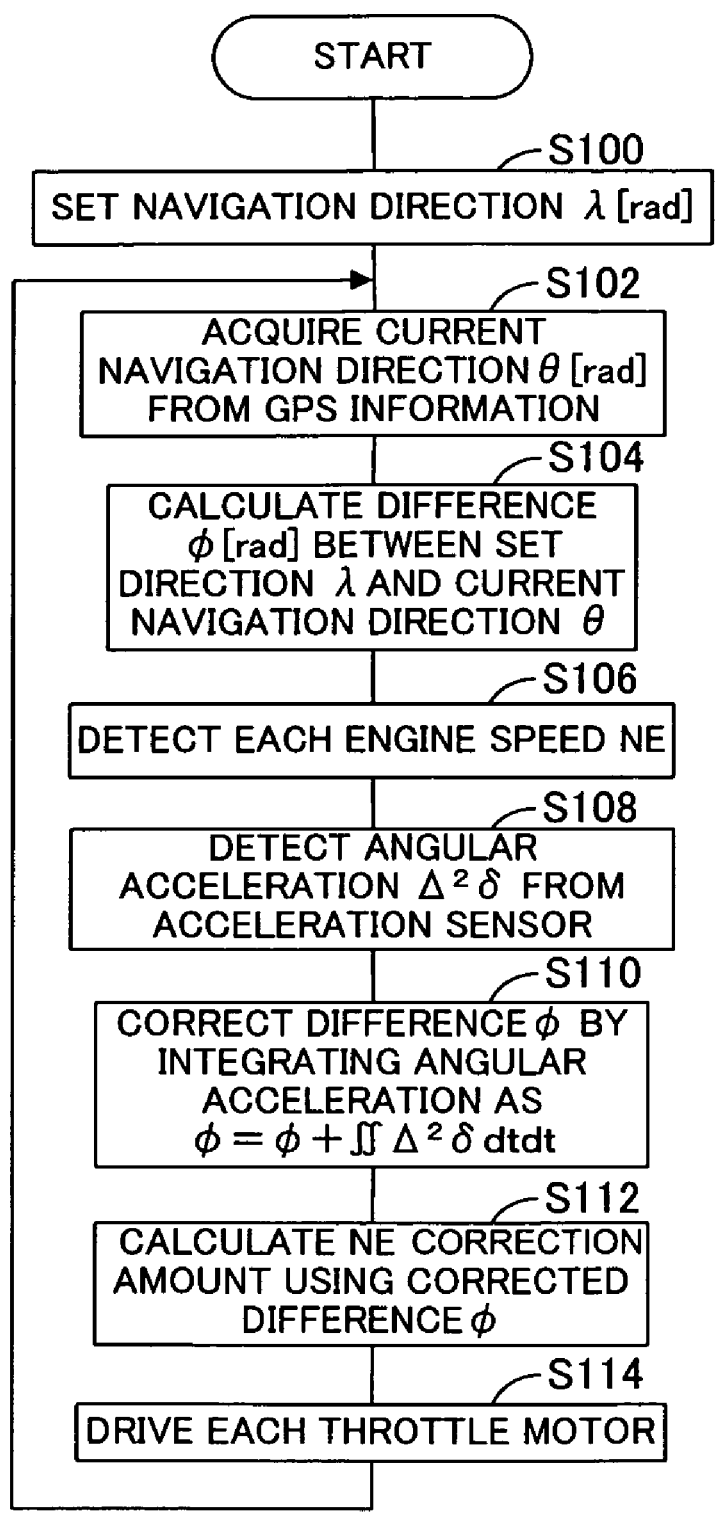
FIG. 10 is a flowchart showing the operation of a control apparatus for small boat according to a second embodiment of this invention.

FIG. 10 is a flowchart showing the operation.

Figure 11:
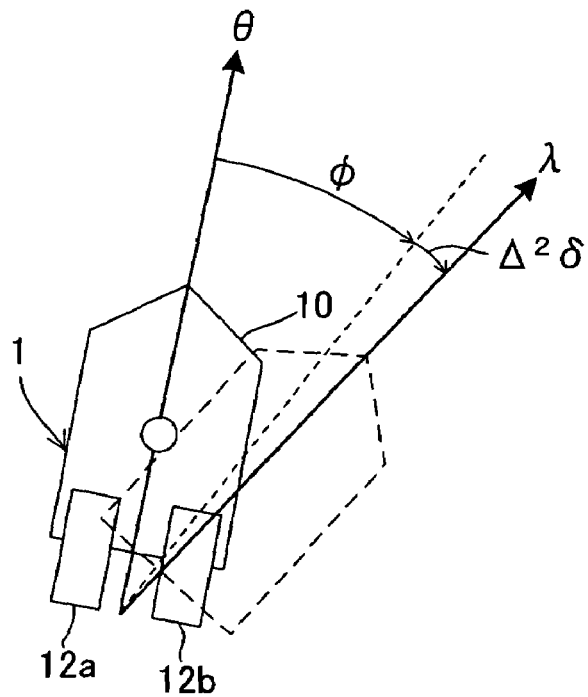
FIG. 11 is a view for explaining the processing of FIG. 10.

In S100, a desired navigation direction (azimuth) λ in which the boat 1 should be navigated is set or inputted, in S102, a direction (azimuth) θ in which the boat 1 is actually navigated is determined from the GPS information of the declinometer 82, and in S104, a difference φ therebetween is calculated. FIG. 11 shows those values. Note that the values here are calculated in a unit of [rad].

Next in S106, the engine speed NE of each of the engines 30 mounted on the outboard motors 12a, 12b is detected based on the outputs of the crank angle sensors 76, and in S108, angular acceleration $\Delta^2\delta$ acting on the boat 1, i.e., the hull 10 about the gravity axis is detected based on the output of the acceleration sensor 84.

In S110, a value of an integral of the detected angular acceleration $\Delta^2\delta$ about the gravity axis is calculated and added to the difference φ calculated in S104 to correct the difference φ. Then in S112, the engine speed correction amount is retrieved from mapped values using the corrected difference φ as address data.

Figure 12:
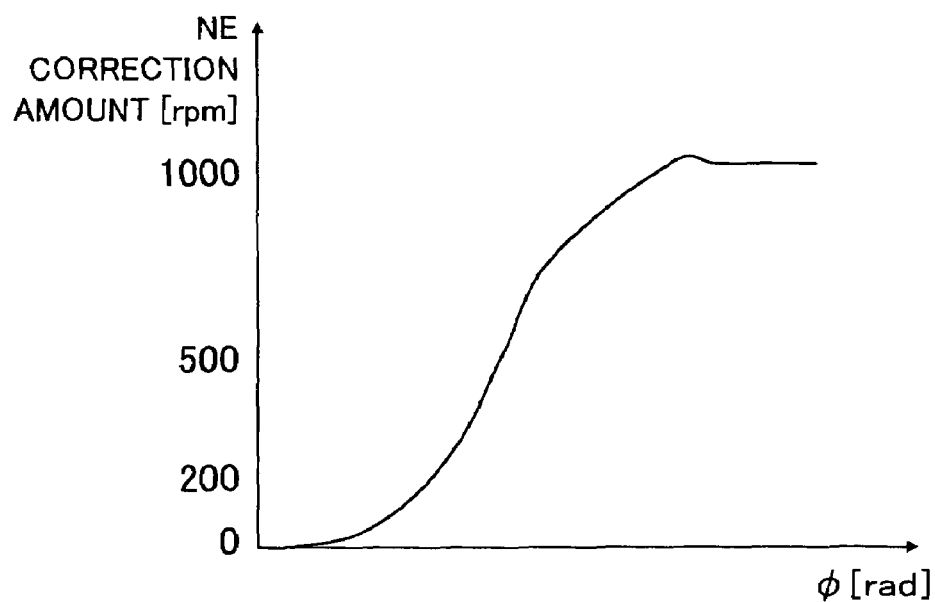
FIG. 12 is an explanatory graph showing the characteristics of mapped values for the engine speed correction amount used in the processing of FIG. 10.

FIG. 12 is an explanatory graph showing the characteristics of the mapped values. As shown, the engine speed correction amount is set beforehand with respect to the difference φ, i.e., it is set to increase with increasing difference φ.

The program proceeds to S114, in which the throttle motor 40 of the engine 30 mounted on one of the outboard motors 12a, 12b which affects the correction of navigation direction (e.g., the port outboard motor 12a when the navigation direction is to be corrected to diagonally rightward as in an example of FIG. 11) is driven (i.e., the operation thereof is controlled) so as to increase the engine speed NE by the correction amount. Then the program returns to S102 and the foregoing processing is repeated. In the flowchart of FIG. 10, the processing from S102 to S114 is executed at every 300 msec.

Explaining further on the above processing, since the declinometer 82 receives the GPS signal about only once per 1 second, an error is generated in the actual navigation direction θ that is calculated using the GPS information from the declinometer 82.

Therefore, in this embodiment, angular acceleration acting on the boat 1 (precisely, the hull 10) about the gravity axis is detected and based thereon, the actual direction (azimuth) detected from the declinometer 82 is corrected. With this, it becomes possible to mitigate a burden on the operator without taking a wrong direction.

Specifically, in the case of determining a navigation direction using a compass, the operator needs to frequently check the direction or azimuth with the compass. In this embodiment, the use of the declinometer 82 that receives the GPS signal enables to mitigate a burden on the operator and, since the direction is corrected using the output of the acceleration sensor 84, it becomes possible to further mitigate a burden on the operator and also determine a navigation direction correctly.

As stated above, the first embodiment is configured to have an apparatus for controlling a small boat (1) having a hull (10), at least one outboard motor (12a, 12b) driven by an internal combustion engine (30) and adapted to be mounted on a stern of the hull, and an actuator (throttle motor 40) adapted to open/close a throttle valve (38) of the engine for regulating speed of the engine, comprising: an acceleration sensor (84) installed on the boat to generate an output indicative of acceleration acting on the boat in a direction of gravity axis; a correction amount calculator (ECU 80a, S10 to S16; S100 to S114) that calculates a correction amount of the engine speed NE based on the output of the acceleration sensor so as to change behavior of the boat; and an actuator controller (ECU 80*a*, S18; S114) that controls operation of the actuator based on the calculated correction amount.

With this, it becomes possible to detect behavior of the boat 1 when being affected by disturbance of ocean wave based on acceleration and, based thereon, correct the engine speed NE so as to change the behavior of the boat, i.e., eliminate the influence of disturbance, thereby mitigating a burden on the operator and improving stability of the boat 1.

In the apparatus, the correction amount calculator calculates the correction amount of the engine speed such that a speed of the boat increases when the acceleration in the gravity axis increases and the correction amount of the engine speed is set beforehand with respect to the output of the acceleration sensor.

With this, it becomes possible to detect a condition of the boat 1, for example, a condition where the boat 1 ascends the slope of wave, through the increase in acceleration in the direction of gravity axis. In such a case, since the correction amount of the engine speed NE is calculated so that the navigation speed increases (i.e., the increase correction amount is calculated), the boat speed can be kept constant including the situation where the boat 1 descends the slope of wave, thereby mitigating a burden on the operator and improving stability of the boat 1.

In the apparatus, the number of the outboard motors 12 mounted on the stern of the hull is two or more and the apparatus includes: a declinometer (82) that produces an output indicative of a direction of navigation of the boat; and the correction amount calculator (ECU 80*a*, S100 to S112) corrects the navigation direction based on detected angular acceleration $\Delta^2\delta$ about the gravity axis and calculates the correction amount of the engine speed of each of the outboard motors so as to change the behavior of the boat such that the boat moves towards the corrected navigation direction. In the apparatus, the correction amount calculator corrects the navigation direction by calculating a difference $\phi$ between a desired navigation direction and an actual navigation direction and by correcting the difference by the detected angular acceleration, and the correction amount of the engine speed is set beforehand with respect to the difference between the desired and actual navigation directions.

With this, it becomes also possible to detect behavior of the boat 1 when being affected by disturbance of ocean wave based on acceleration and, based thereon, correct the engine speed NE so as to change the behavior of the boat, i.e., eliminate the influence of disturbance, thereby mitigating a burden on the operator and improving stability of the boat 1.

It should be noted that although, in the foregoing, the two outboard motors 12 are mounted or fixed on the hull 10, the invention can also be applied to multiple outboard motor installations comprising three or more outboard motors.

It should further be noted that, although the number of the steering wheels 921, 922 is set to two, it can instead be one or three, or more. The point is that, as far as the configuration enables the operator to input a steering command, the number thereof is not a problem.

Japanese Patent Application No. 2008-141963 filed on May 30, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling a small boat having a hull, at least one outboard motor driven by an internal combustion engine and adapted to be mounted on a stern of the hull, and an actuator adapted to open/close a throttle valve of the engine for regulating speed of the engine, comprising:

an acceleration sensor installed on the boat to generate an output indicative of acceleration acting on the boat in a direction of gravity axis;

a correction amount calculator that calculates a correction amount of the engine speed for said at least one outboard motor based on the output of the acceleration sensor so as to change behavior of the boat such that the boat moves toward a corrected navigation direction; and an actuator controller that controls operation of the actuator based on the calculated correction amount;

wherein the correction amount calculator calculates the correction amount of the engine speed such that a speed of the boat increases when the acceleration in the direction of gravity axis increases.

2. The apparatus according to claim 1, wherein values of the correction amount of the engine speed are predetermined and set beforehand with respect to the output of the acceleration sensor.

3. The apparatus according to claim 1, wherein the number of the outboard motors mounted on the stern of the hull is two or more and including:

a declinometer that produces an output indicative of a direction of navigation of the boat;

the acceleration sensor output is indicative of angular acceleration about the gravity axis; and the correction amount calculator calculates correction amounts of the engine speeds for the outboard motors so as to correct the behavior of the boat such that the boat moves toward the corrected navigation direction based on angular acceleration about the gravity axis detected by the acceleration sensor.

4. The apparatus according to claim 3, wherein the correction amount calculator calculates a difference between a desired navigation direction and a detected navigation direction determined from the output of the declinometer and calculates the correction amounts of the engine speeds for the outboard motors so as to correct the calculated difference based on the output of the acceleration sensor.

5. The apparatus according to claim 3, wherein values of the correction amounts of the engine speeds are predetermined and set beforehand with respect to the difference between the desired and detected navigation directions.

6. A method of controlling a small boat having a hull, at least one outboard motor driven by an internal combustion engine and adapted to be mounted on a stern of the hull, and an actuator adapted to open/close a throttle valve of the engine for regulating speed of the engine, comprising the steps of:

detecting acceleration acting on the boat in a direction of gravity axis;

calculating a correction amount of the engine speed for said at least one outboard motor based on the detected acceleration so as to change behavior of the boat such that the boat moves toward a corrected navigation direction; and controlling operation of the actuator based on the calculated correction amount;

wherein the step of correction amount calculation calculates the correction amount of the engine speed such that a speed of the boat increases when the acceleration in the gravity axis increases.

7. The method according to claim 6, wherein values of the correction amount of the engine speed are predetermined and set beforehand with respect to the output of the acceleration sensor.

8. The method according to claim 6, wherein the number of the outboard motors mounted on the stern of the hull is two or more and including the step of:

detecting a direction of navigation of the boat;

the acceleration sensor output is indicative of angular acceleration about the gravity axis; and the step of correction amount calculation involves calculating correction amounts of the engine speeds for the outboard motors so as to correct the behavior of the boat such that the boat moves toward the corrected navigation direction based on detected angular acceleration about the gravity axis.

9. The method according to claim 8, wherein the step of correction amount calculation involves calculating a difference between a desired navigation direction and the detected navigation direction of the boat and by calculating the correction amounts of the engine speeds for the outboard motors so as to correct the calculated difference based on the detected angular acceleration.

10. The method according to claim 8, wherein values of the correction amounts of the engine speeds are predetermined and set beforehand with respect to the difference between the desired and detected navigation directions.

* * * * *